United States Patent [19]

Burnett

[11] 4,106,061
[45] Aug. 8, 1978

[54] DENSITY CONTROL FOR INK JET COPIER
[75] Inventor: James E. Burnett, Xenia, Ohio
[73] Assignee: The Mead Corporation, Dayton, Ohio
[21] Appl. No.: 774,154
[22] Filed: Mar. 3, 1977
[51] Int. Cl.² .......................... H04N 1/22; H04N 1/40
[52] U.S. Cl. .................................. 358/296; 358/283; 358/284; 358/298
[58] Field of Search ................ 358/283, 284, 296, 298

[56] References Cited
U.S. PATENT DOCUMENTS

| | | | |
|---|---|---|---|
| 1,973,725 | 9/1934 | Ranger | 358/284 |
| 3,197,558 | 7/1965 | Ernst | 358/283 |
| 3,294,896 | 12/1966 | Young | 358/283 |
| 3,482,039 | 12/1969 | Valentin et al. | 358/283 |
| 3,580,995 | 5/1971 | Klensch | 358/283 |
| 3,613,103 | 10/1971 | Harris | 358/284 |
| 3,928,718 | 12/1975 | Sagae et al. | 358/296 |
| 3,977,007 | 8/1976 | Berry et al. | 358/283 |
| 4,001,492 | 1/1977 | Suzuki et al. | 358/298 |

Primary Examiner—Raymond F. Cardillo, Jr.
Attorney, Agent, or Firm—Biebel, French & Nauman

[57] ABSTRACT

An ink jet copier for copying a master includes an optical scanner which provides an output directly related to the tone of the master at successive points along a scan line on the master. An intergrator repetitively integratesthe output of the scanner and provides a first enabling print signal each time the integral of the scanner output reaches a predetermined level. The integrator resets each time this predetermined integral level is reached. A level detector also monitors the scanner output and provides a second enabling signal when the scanner output exceeds a predetermined level. A print control is responsive to the level detector and the integrator and provides a print control pulse train output upon receipt of either of the first or second enabling signals. An ink jet printer receives the print control output and deposits selected ink drops along a print line on the copy medium which corresponds to the scan line of the master.

11 Claims, 6 Drawing Figures

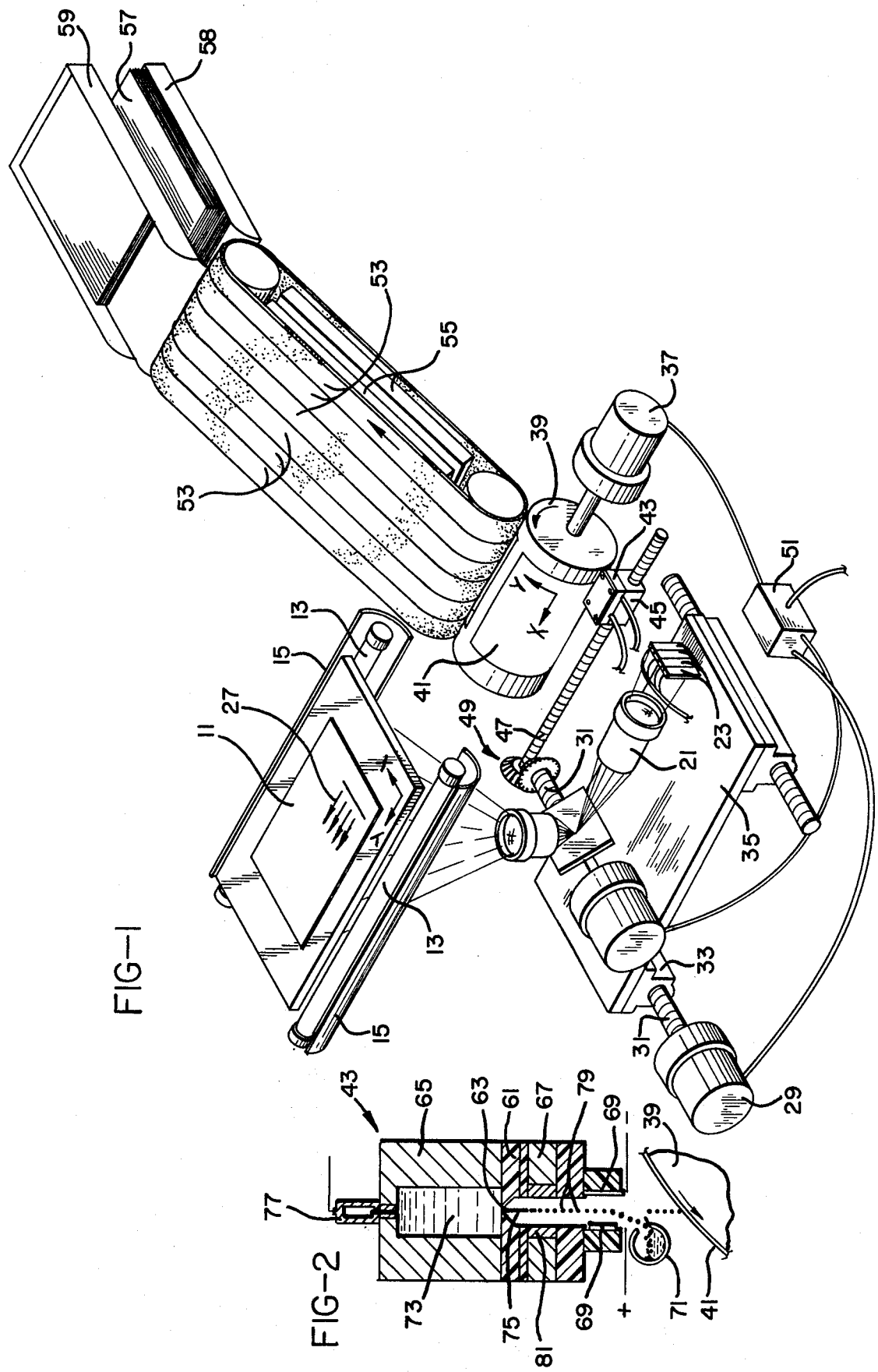

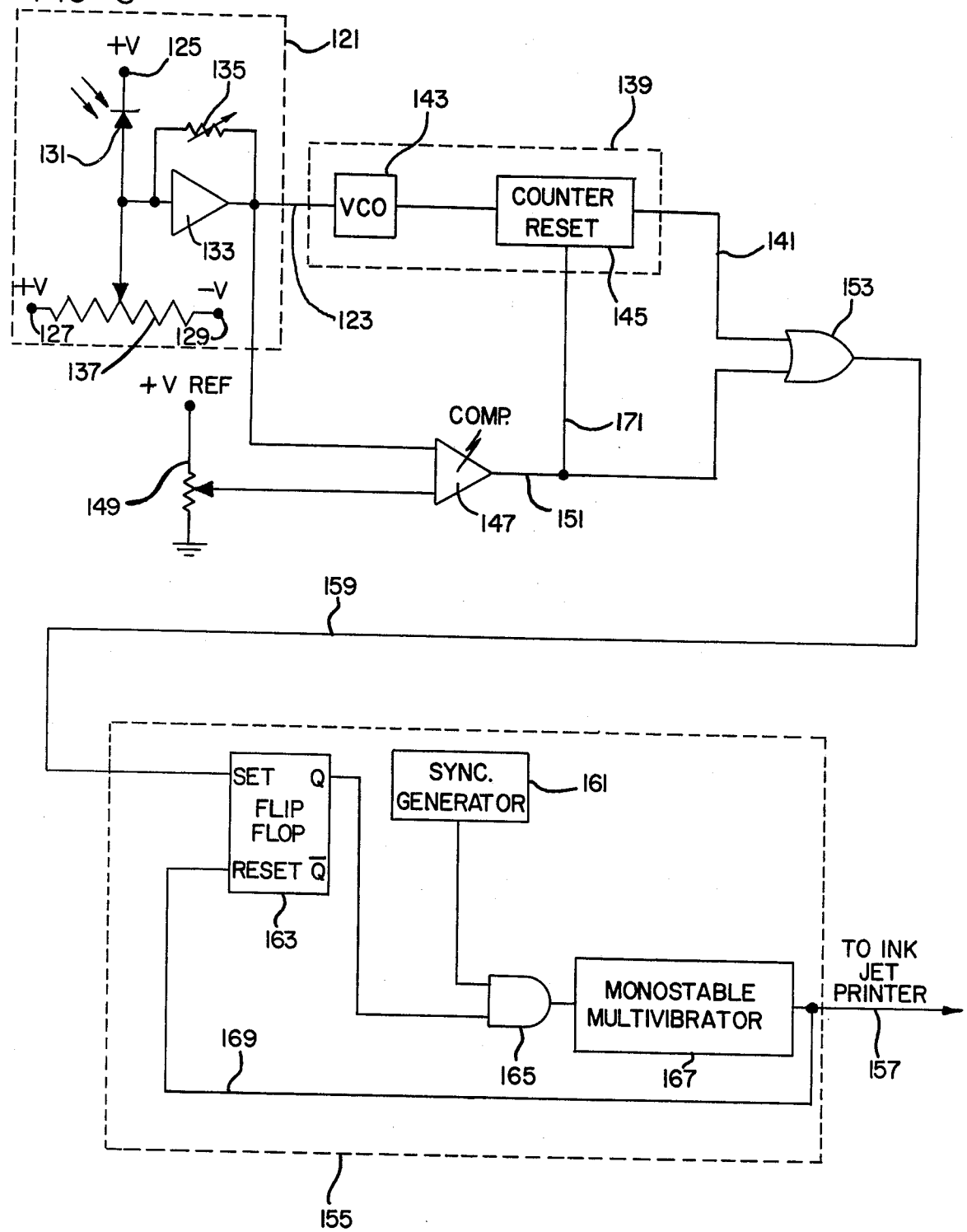

DENSITY CONTROL FOR INK JET COPIER

BACKGROUND OF THE INVENTION

The present invention relates to optical encoders and, more particularly, to encoders which may be used to provide print control information in an ink jet copier for copying all types of materials, including printed text and photographs. In recent years ink jet printing has developed in sophistication to the point where it is now possible to print both text material and other types of printed material, such as photographs with a high degree of resolution. A technique similar to half-tone printing is used to reproduce photographs and other graphics. The photograph is reproduced by depositing ink drops closely together in areas which are to be dark in tone and further apart in areas which are to be lighter in tone. This does not correspond precisely to half-tone printing, since in that technique the dots are uniformly spaced between centers but are of differing size. The resulting image is quite similar in effect, however.

In order to utilize an ink jet printer as the printing mechanism for a copier, it is necessary to have some method of scanning the master to produce print control information which will space the ink drops the appropriate distance apart in order to reproduce the master. It is known in the prior art to illuminate a master and then, by means of a rotating mirror or other optical arrangement, direct the reflected light from along a scan line on the master to one or more optical lenses which, in turn, direct this light to a photoelectric transducer. The output signal from the photoelectric transducer provides an indication of the printed material along the scan line of the master, with more light being reflected from the lighter toned areas, indicating little or no ink deposits in these areas. The master may be scanned a number of times along parallel closely spaced scan lines until sufficient information is obtained to control the print operation. Alternatively, a stationary optical configuration may be used, as shown in U.S. Pat. No. 3,604,846, issued Sept. 14, 1971, to Behane et al, and assigned to the assignee of the present invention. In the Behane et al encoder, light is transmitted through the master, with the master being moved with respect to the optical system.

Another scanning arrangement is shown in U.S. Pat. No. 3,928,718, issued Dec. 23, 1975, to Sagae et al. In the Sagae et al device, the master is placed on a rotating drum. The optical scanning arrangement is slowly moved axially along the rapidly rotating drum, thus scanning a plurality of scan lines on the master. Various techniques have been used to convert the analog output from the photoelectric transducer associated with the scanner into a form useful in controlling print operations. One technique disclosed in U.S. Pat. No. 3,580,995, issued May 25, 1971, to Klensch, is to use the analog output to control a variable oscillator. The sheet upon which the copy is to be printed in scanned by the printing mechanism (here a cathode ray tube) in synchronism with the scanning of the master and, upon each successive output pulse from the oscillator, a dot is printed on the copy sheet. After the entire image has been scanned along a number of parallel scan lines on the master and on the copy, the copy will resemble a half-tone reproduction of the master.

As suggested in U.S. Pat. No. 3,373,437, issued Mar. 12, 1968, to Sweet et al, an ink jet printer lends itself quite well to printing images in a range of tones, such images being supplied in the form of video or facsimile signals. The drops supplied to the copy medium by the printer are of relatively small size and their deposit may be precisely controlled. In the Sweet et al device, the drops are counted out in correspondence to the gray level desired. The circuit operates on a pulse stretching technique in which the pulse width is proportional to the gray level.

A problem with scanning and encoding image information accurately occurs when a master is scanned which includes thin lines perpendicular to the scan line. If any integration is involved in encoding information, such as a divide-by-N counter on a variable oscillator output, it is quite possible that these lines will not be printed or that they will be distorted drastically.

U.S. Pat. No. 1,790,723, issued Feb. 3, 1931, to Ranger, discloses facsimile encoding and transmission systems in which the copy is scanned along a series of parallel, closely spaced, scan lines. Print information is encoded into a series of pulses which may be transmitted over a telegraph or telephone line. Each pulse will result in a drop or a line of ink being placed on the copy along the copy scan line. The facsimile picture is built up from a series of such dots and lines. The encoding technique used by Ranger is one in which a pair of capacitors are alternately charged from an analog signal supplied by a photoelectric transducer. The capacitors act as integrators and cause an output signal to be switched between two potentials each time a sufficient voltage is impressed upon one of the capacitors. Dots and lines are placed on the copy under control of this pulse train output signal. In an improvement patent to Ranger, U.S. Pat. No. 1,973,726, issued Sept. 18, 1934, an attenuation to the integrating capacitors is provided in the circuit during normal operations. When, however, a sudden transition occurs, this attenuation is bypassed and printing will occur much more rapidly. While improving the definition of the resulting facsimile picture, the bypass capacitors used in the improved Ranger device cause a significant increase in the noise in the system, since they are acting as differentiators.

Thus, it is seen that there is a need for a method and apparatus for improving the encoding of print information for an ink jet copier.

SUMMARY OF THE INVENTION

An optical encoding device for measuring the tone of a master along a scan line and for producing an image signal pulse train has a photo sensitive means providing a signal level on its output which is dependent upon the light which strikes it. Means for illuminating the master and optical means for scanning the master along the scan line and directing light reflected from successive portions along the scan line provide the light which strikes the photosensitive means. A variable oscillator means is responsive to the output of the photosensitive means and provides an output signal of a frequency which is dependent on the output of the photosensitive means. An overflow counter means is responsive to the output signal of the variable oscillator means and repetitively counts the output. The overflow counter means provides a first enabling signal each time a predetermined number of oscillations are counted. A level detector means is responsive to the output from the photosensitive means and provides a second enabling signal when the output of the photosensitive means exceeds a predetermined level. Gate means are provided which is responsive to the output of the counter means and the level detecting means for providing an image signal upon receipt of either of the first and second enabling signals.

The overflow counter means is responsive to the level detector means for resetting the counter upon receipt of the second enabling signal. The photosensitive means may comprise a photosensitive diode, a reference voltage means and an amplifier for providing an output signal which is inversely related to the light striking diode. A synchronization means may also be provided which is responsive to the gate means and which provides a pulse train output in synchronization with the timing signal.

The synchronization means and gate means may form a part of a print control means which provides a print control pulse train to an ink jet printer generating ink drops at the frequency of the timing signal and for depositing selected drops on a print line on the copy corresponding to the scan line on the master.

Accordingly, it is an object of the present invention to provide an ink jet copier which can scan and encode all types of print materials and provide print signals to an ink jet printer which result in an improved definition of reproduced material without an increase in the noise components, to provide such a copier in which the output pulses from a voltage control oscillator provide the print signals during periods of gradual tone transition in the print materials; and, to provide a such copier in which the output of a level detector provides the print signals during periods of rapid transition to the high density printing regions of the print material.

Other objects and advantages of the invention will be apparent from the following description, the accompanying drawings and the appended claims.

BRIEF DESCRIPTION OF THE DRAWINGS

FIG. 1 is a perspective view showing an optical scanning and ink jet printing arrangement that may be used in the ink jet copier of the present invention;

FIG. 2 is a section taken through the ink jet print head generally along line 2—2 in FIG. 1;

FIG. 6 is a circuit diagram showing a density control circuit of the present invention for controlling the operation of an ink jet copier.

DETAILED DESCRIPTION OF THE PREFERRED EMBODIMENTS

Figure 3:
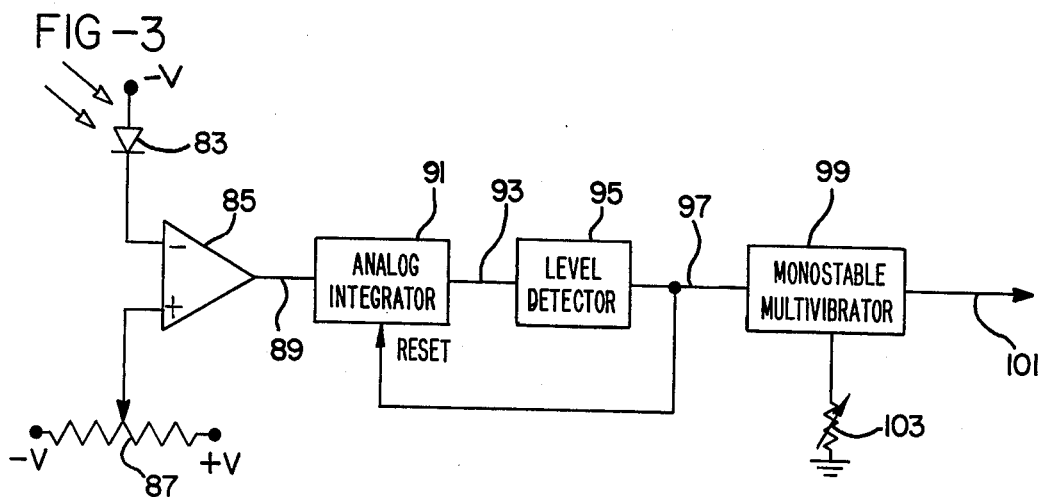
FIG. 3 is a circuit diagram of an optical encoder which uses analog techniques.

The present invention relates to an ink jet copier of the type which may be used to copy all types of printed text and graphic materials. The copier includes a scanner arrangement for optically scanning a master which is to be reproduced and for providing an electrical signal indicative of the tone of the master along a number of scan lines. The output of the scanner is converted by an encoder mechanism into print control signals which are used to control an ink jet printer. The ink jet printer deposits drops of ink on a sheet of copy paper to reproduce the image which was scanned on the master.

Reference is now made to FIG. 1 in which is shown an optical scanner of the type which may be used with an ink jet copier of the present invention. A master 11, which may include graphic or text material, or both, is placed face down on a support plate 13 of transparent material, such as glass.

A means for illuminating the master includes lamps 13 and reflectors 15 which are positioned to provide a uniform illumination of the printed surface of the master. Light reflected from the master 11 is directed by mirror 17 and lenses 19 and 21 to a photosensitive means including a plurality of photoelectric transducers 23, to be described more completely below. The mirror and lense arrangement is such that light reflected from a relatively small portion of the master 11 is directed to the photoelectric transducers 23.

Mirror 17 is mounted on a shaft connected to servo motor 25. As the mirror rotates, each of the transducers 23 receives light reflected from the master along a respective one of a plurality of parallel scan lines 27 on the master. The electrical output from each of the transducers 23 indicates the tone, that is, the "blackness" or "whiteness," of the master along its respective scan line. One rotation of the mirror will therefore result in a strip of the master being scanned in its Y direction.

Servo motor 29 rotates threaded rod 31 which is threaded through member 33 attached to scanner table 35. As the servo motor 29 rotates, the scanner table 35, upon which servo motor 25, lenses 19 and 21, and transducers 23 are mounted, is shifted in the X direction with respect to the master 11. The rotation of servo motor 29 is controlled with respect to the rotation of servo motor 25 such that a plurality of parallel scanning passes are made in the Y direction with respect to the master, with each such pass displaced laterally in the X direction with respect to the previous pass.

Servo motor 37 rotates a drum 39 upon which is held a sheet of copy paper 41. Ink jet printer 43 is mounted on member 45 which engages threaded shaft 47. A right angle gear drive 49 at the ends of shafts 31 and 47 rotates shaft 47 in synchronism with shaft 31. The speed of rotation of servo motor 37 is controlled by servo controller 51 such that the ink jet printer 43 will make one print pass in the Y direction over the copy paper 41 in synchronism with one scanning pass in the Y direction over the master 11. Ink jet printer 43 has a plurality of jets with each of the jets printing in response to outputs from corresponding respective ones of the photosensitive transducers 23. Ink jet printer 43 moves laterally with respect to copy paper 41 in synchronism with the lateral movement of the scanner. It is clear, therefore, that the scanner scans along scan lines on the master in precise synchronism with the printer moving along corresponding print lines on the copy paper.

A plurality of vacuum belts 53 cooperate with evacuated chambers 55 to transfer copy paper 57 from tray 58 to drum 39 for printing and, after the printing operation is completed, to transfer the printed copies to tray 59. The scanner mechanism and the ink jet printer disclosed in FIG. 1 cooperatively scan and print a helically interplaced pattern as fully explained in copending U.S. patent application Ser. No. 789,417, filed 4/21/77, assigned to the assignee of the present invention. It should be realized, however, that there are many other optical scanning arrangements, including the scanning mechanisms disclosed in the above referenced patents to Behane et al and Sagae et al, which could be used in a copier embodying the present invention.

An ink jet printer of the type which is suitable for use in the present invention is shown in U.S. Pat. No. 3,373,437, issued Mar. 12, 1968, to Sweet et al. The printer mechanism includes a plurality of ink jets, each of the jets controlled by a corresponding photosensitive transducer in the scanner. It should be appreciated that if a copier having a somewhat reduced definition is desired, a single photosensitive transducer may be used to scan a somewhat larger area and control more than one adjacent ink jet in the printer. In the device illustrated in FIG. 1, four photosensitive transducers are shown in the scanner and, correspondingly, printer 43 should include four jets spaced apart a distance corresponding to the spacing of the four scan lines 27 on the master 11.

Referring to FIG. 2, an ink jet printer of the type which may be used in the present invention is shown. FIG. 2 is a sectional view taken generally along line 2—2 in FIG. 1 and illustrating only one jet. Printer 43 may be of a laminar construction as generally taught by U.S. Pat. No. 3,586,907, issued June 22, 1971, to Beam et al. If desired, the printer might produce two parallel rows of jets as taught by U.S. Pat. No. 3,701,998, issued Oct. 31, 1972, to Mathis, in which case the photosensitive transducers 23 would necessarily be similarly arranged.

For a single row printer, orifice plate 61 is provided with orifices such as orifice 63, arranged in a line and separated by the distance between parallel scan lines as described above. Typically each orifice may have a diameter of about 0.04 mm with the orifices spaced on 0.5 mm centers. A fluid supply manifold 65, an orifice plate 61, a charge ring plate 67, deflection electrodes 69 and a catcher 71 comprise the primary elements of the printer. Manifold 65 contains a supply of conductive printing ink 73 which flows under pressure through orifice 63 to form ink jet filament 75.

Stimulator 77, operating under control of control unit 51, stimulates the filament 75 and causes it to breakup into a stream of uniformly spaced drops 79. The drops are charged selectively by charge ring 81 which is in registration with orifice 63. Those drops which are charged are deflected by electrodes 69 into catcher 71 while the uncharged drops pass undeflected between the electrodes and are deposited onto the copy paper 41.

Drop charging and deflection is carried out as taught by the above mentioned Beam and Mathis patents with drop charging being under control of the photosensitive transducer signals. The outputs from the transducers 23 must, however, be encoded in order to control the print operation. Drop stimulation can be accomplished in such a manner that all drops in all streams are generated in the same phase. For this purpose there may be employed a stimulation arrangement, as shown in U.S. Pat. No. 3,700,162 issued Oct. 24, 1972, to Titus et al.

Figure 4:
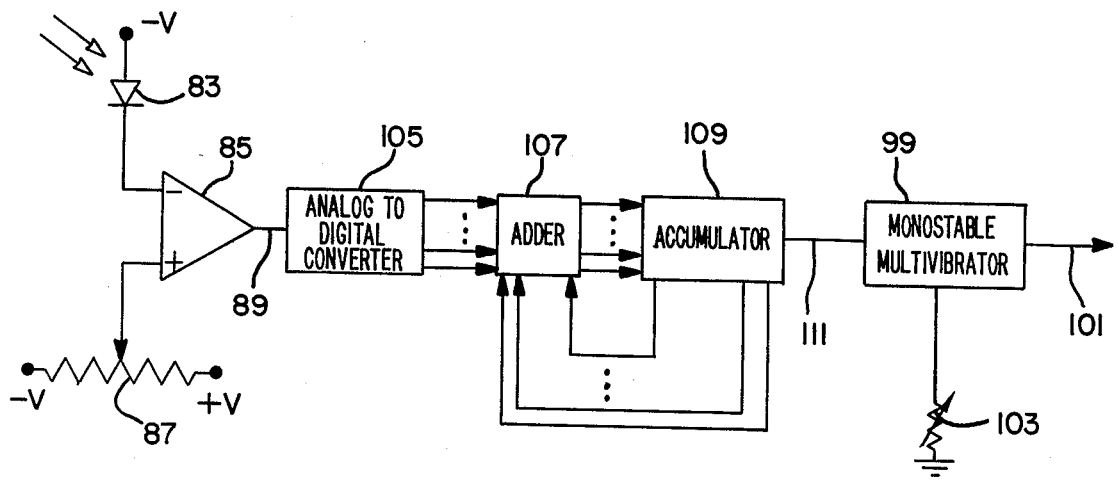
FIG. 4 is a circuit diagram of an optical encoder which uses digital techniques.
Figure 5:
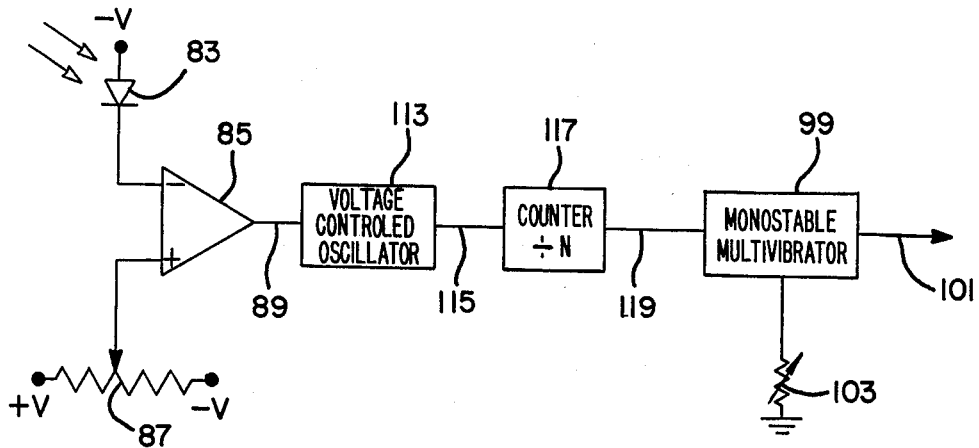
FIG. 5 is a circuit diagram of another type of digital optical encoder.

Reference is now made to FIGS. 3-5, which illustrate various optical encoding arrangements. In the preferred embodiment, each jet and its corresponding photosensitive transducer is operated independently of the other jets and transducers. Circuitry for encoding the output of a single photosensitive transducer and supplying print information to a single jet will be disclosed with the understanding that each jet/transducer combination will require an identical encoder and control circuit arrangement.

Referring now to FIG. 3, a schematic representation of an analog optical encoding device is shown. A photosensitive diode 83 is reversed biased by a reference voltage means which provides a −V potential at the anode of diode 83. When diode 83 is exposed to light, the reverse current flowing through the diode provides an indication of the amount of light which is falling on the diode. The cathode of diode 83 is connected to a negative input of non-inverting summer 85.

Variable potentiometer 87 is connected to positive and negative reference potentials and is set to provide an operating bias point for the encoder. As the light striking photosensitive diode 83 increases, the output potential from summer 85 will decrease. Potentiometer 87 is set so that even when diode 83 is fully illuminated and supplying the largest possible reverse current to summer 85, the summer will still have a minimum positive output potential. This minimum potential determines the shade of a light gray tone which is printed whenever a totally white area of the master is scanned. This gray background effect produces an image which will appear more natural to the eye of an observer when a photograph or similar material is included on the master. Potentiometer 87 permits the operating point of the scanner to be adjusted. Output 89 will, therefore, remain at an elevated potential above ground.

Analog integrator 91 integrates the signal applied on line 89 and provides an output on line 93 which is proportional to this integral. A level detector 95 of known construction monitors the output of the integrator 91 and, when this output reaches a predetermined level, supplies a pulse at its output on line 97. The pulse train on line 97 is fed to the reset input of analog integrator 91, thus causing the analog integrator to begin integration again. Analog integrator 91 is also of known construction and may conventionally include an operational amplifier with a capacitive feedback arrangement. The capacitor in the feedback loop will be discharged upon receipt of each reset pulse from level detector 95. A monostable multivibrator 99 is connected to the output of level detector 95 and is triggered thereby to provide a pulse train output on line 101 which is equal in frequency to the output of the lever detector. The duration of each pulse in the pulse train may be set by variable resistor 103. The pulse train output on line 101, therefore, is synchronized by appropriate circuitry and used to control the operation of one jet in the ink jet printer. The darker the tone of the master, the higher will be the frequency of the pulse train on line 101.

One problem with this encoding device is the reduced linearity of operation when the device is operated at high output frequencies. The capacitor in the feedback path of analog integrator 91 must be discharged at the end of each integration cycle in order to reset the integrator. The short but finite discharge time is added to the integration time of the integrator 91 and therefore affects the output frequency of the pulse train output on line 101.

FIGS. 4 and 5 illustrate digital circuits which are similar to that shown in FIG. 3, with like numerals used for corresponding elements. In the encoder circuit of FIG. 4, an analog to digital converter 105 receives the analog signal output of summer 85 and provides a binary number in parallel form to adder 107. Adder 107 adds the number received from converter 105 to the number previously stored in accumulator 109. The accumulator and adder, therefore, act together as an integrator with the number stored in the accumulator 109 being proportional to the integral of the signal on line 89. The output line 111 carries overflow pulses from the accumulator 109 to the multivibrator 99. It will be appreciated that the frequency of the pulses on line 111 will be proportional to the analog signal on line 89.

FIG. 5 illustrates another digital encoder in which a voltage controlled oscillator 113, of known construction, supplies a pulse train output on line 115 which is proportional in frequency to the potential of signal on line 89. A divide-by-N counter 117 divides down the output of the oscillator 113 and provides a pulse train output on line 119 which is also proportional to the analog signal on line 89. Multivibrator 99 modifies this pulse train in the manner discussed above.

One problem with encoders of the type illustrated in FIGS. 3-5 occurs when a photograph or drawing is encoded having thin black lines which are perpendicular to the direction of scanning. Since all three of these encoders use integration, the time in which the scanner is scanning across the black line may not be sufficient for integration and the generation of a print control pulse. The line may therefore be displaced slightly with respect to its actual position on the master or otherwise distorted.

Reference is now made to FIG. 6, in which is shown an improved optical encoding device for encoding the tone of a master along a scan line and for producing a print control pulse train output signal. The optical scanner for the ink jet copier of the present invention includes a photosensitive means 121 which provides a signal level at its output 123 which is dependent upon the light which is directed to it by the scanner. A reference voltage means applies a +V reference potential at terminal 125 and 127 and a −V potential at terminal 129. A photosensitive diode 131 permits varying amounts of reverse current to pass in proportion to the light which strikes it. The more light striking diode 131, the greater its reverse current. Operational amplifier 133 and variable resistor 135 form an amplifier means for providing a signal output in dependence upon the reverse current passing through diode 131.

The resistor 135 is adjusted to control the gain of the amplifier. The resistor 137 sets the operating level for the photosensitive means 121 such that the printer will print a faint gray tone even when the diode 131 is fully illuminated. An integrator means 139 is responsive to the analog output on line 123 for repetitively integrating the output of the scanner and providing a first enabling signal on line 141 when the integral reaches a predetermined level. The integrator means 139 includes a variable oscillator 143 and a counter 145. The voltage controlled oscillator 143 provides an output signal of a frequency which is dependent on the output of the photosensitive means and the counter 145 is responsive to the output of the oscillator. Counter 145 is a divide-by-N counter which provides an output pulse on line 141 after every N cycles of the oscillator output.

A level detector means includes a comparator 147 and a potentiometer 149 which provides a reference voltage. The comparator provides a second enabling signal on line 151 when the output 123 exceeds a predetermined level set by potentiometer 149.

A print control means includes a gate means 153 and a synchronization means 155 and is responsive to the level detector means and the integrator means for providing a print control pulse train output on line 157 upon receipt of either of the first and second enabling signals. Line 157 is connected to charge ring 81 (FIG. 2). Gate means 153 comprises an OR gate which is responsive to the output of the counter 145 and the comparator 147 for providing an image signal on line 159 upon receipt of either of the first and second enabling signals. The image signal is synchronized by synchronization means 155 with a system timing signal provided by sync generator 161.

The synchronization means 155 includes a flip-flop 163 which is set by a pulse on line 159. The Q output of flip-flop 163 is applied to AND gate 165. The output of AND gate 165, in turn, is applied to the monostable multivibrator 167 which, in turn, provides the control output signal to the ink jet printer of the copier. The output of multivibrator 167 is also applied via line 169 to the reset input of flip-flop 163. When a pulse is received on line 159, flip-flop 163 will be set and its Q output will go high. This will enable AND gate 165 such that the next synchronization pulse received from sync generator 161 will be passed by gate 165 to multivibrator 167. The output of multivibrator 167 will then reset flip-flop 163, thus enabling the synchronization means to provide a further output.

Sync generator 161 provides a pulse train which is synchronized with tachometer signals from a tachometer on servo motor 37 (FIG. 1). The need for such synchronization becomes apparent if it is assumed that a master having a gray level is being scanned and that motor 37 should stop for some reason. In such a situation the integrator means 139 will continue to provide a first enabling signal on line 141 which, without synchronization, would result in the copy paper being flooded with ink drops. The synchronization means 155 prevents this from happening, however, since the sync generator output will stop and gate 165 will be disabled.

It is seen that the optical encoding device of FIG. 6 will overcome the problems discussed above regarding scanning and encoding thin black lines which are perpendicular to the scan direction. The level detector means including comparator 147 and resistor 149 will bypass the integrator arrangement 139 so that printing can be initiated immediately when a portion of the master having a sufficiently dark tone is scanned. Additionally, the output of comparator 147 is supplied to counter 145 via line 161 to maintain the counter in a reset condition until the lever drops below that set by the resistor 149. When this occurs, the integrator means 139 once again assumes control of the production of the image signal on line 159.

While the forms of apparatus herein described constitute preferred embodiments of the present invention, it is to be understood that the invention is not limited to these precise forms of apparatus and that changes may be made therein without departing from the scope of the invention.

What is claimed is:

1. An optical encoding device for measuring the tone of a master along a scan line and for producing an image signal pulse train, the frequency of the pulses in the pulse train being directly related to the tone of the master along the scan line, comprising:
   photosensitive means providing a signal level at its output which is dependent upon the light which strikes it,
   means for illuminating the master,
   optical means for scanning the master along the scan line and directing light reflected from successive portions along the scan line to said photosensitive means,
   variable oscillator means, responsive to the output of said photosensitive means, for providing an output signal of a frequency which is dependent on the output of said photosensitive means, overflow counter means, responsive to the output signal of said variable oscillator means, for repetitively counting the oscillations of the output signal of said variable oscillator means and for providing a first enabling signal each time a predetermined number of oscillations are counted, level detector means, responsive to the output from said photosensitive means, for providing a second enabling signal when the output from said photosensitive means exceeds a predetermined signal level, and gate means, responsive to the output of said counter means and said level detector means, for providing an image signal upon receipt of either of said first and second enabling signals.

2. The optical encoding device of claim 1 in which said overflow counter means is further responsive to said level detector means for resetting the count therein upon receipt of said second enabling signal.

3. The optical encoding device of claim 1 in which said photosensitive means comprises a photosensitive diode, reference voltage means for applying a constant potential to said diode, and amplifier means, connected to said diode, for providing an output signal inversely related to the light striking said diode.

4. The optical encoding device of claim 3 in which said photosensitive means further comprises means for biasing said amplifier means such that the output signal of said photosensitive means does not drop below a predetermined level.

5. The optical encoding device of claim 1 in which said variable oscillator means comprises a voltage controlled oscillator.

6. The optical encoding device of claim 1 further comprising:

synchronization means, responsive to said gate means, for providing a pulse train output signal in synchronization with a system timing signal as long as said image signal is received from said gate means.

7. A density control circuit for controlling the operation of an ink jet copier which scans a master and reproduces the master, comprising:

(a) an optical scanner providing an output proportional to the tone of the master at successive points along a scan line on the master, (b) integrator means, responsive to the output of said scanner, for repetitively integrating the output of said scanner and providing a first enabling signal when the integral of said scanner output reaches a predetermined integral level, said integrator means resetting each time said predetermined integral level is reached, (c) level detector means, responsive to the output of said scanner, for providing a second enabling signal when said scanner output exceeds a predetermined level, and (d) print control means, responsive to said level detector means and said integrator means, for providing a print control pulse train output upon receipt of either of said first or second enabling signals.

8. An ink jet copier for copying a master on a copy medium comprising:

an optical scanner for providing an output directly related to the tone of the master at successive points along a scan line on the master, integrator means, responsive to the output of said scanner, for repetitively integrating the output of said scanner and for providing a first enabling signal when the integral of said scanner output reaches a predetermined integral level, said integrator means resetting each time said predetermined integral level is reached, level detector means, responsive to the output of said scanner, for providing a second enabling signal when said scanner output exceeds a predetermined level, print control means, responsive to said level detector means and said integrator means, for providing a print control pulse train output upon receipt of either of said first or second enabling signals, and ink jet printer means for generating ink drops at a stimulation frequency and for depositing selected ink drops along a print line on a copy medium corresponding to the scan line of the master in response to said print control pulse train output.

9. The ink jet copier of claim 8 in which said optical scanner includes a photosensitive diode and means for providing a signal output in dependence upon the resistance of said diode and further in which said integrator means comprises a voltage controlled oscillator, responsive to the output of said optical scanner, for providing an output signal of a frequency which is dependent upon said optical scanner output, and a divide-by-N counter, responsive to said oscillator, for providing an output pulse every N cycles of said oscillator output.

10. The ink jet copier of claim 9 in which said divide-by-N counter is responsive to said second enabling signal for resetting whenever said scanner output exceeds said predetermined level.

11. The ink jet copier of claim 8, in which said print control means comprises synchronization means for synchronizing said print control pulse train output with the rate at which said ink jet printer means alters the point for depositing drops along said print line.

* * * * *